(12) United States Patent
Danner

(10) Patent No.: US 8,203,968 B2
(45) Date of Patent: Jun. 19, 2012

(54) INTERNET PROTOCOL SERVICE LEVEL AGREEMENT ROUTER AUTO-CONFIGURATION

(75) Inventor: Tim Danner, Austin, TX (US)

(73) Assignee: Solarwinds Worldwide, LLC, Austin, TX (US)

( * ) Notice: Subject to any disclaimer, the term of this patent is extended or adjusted under 35 U.S.C. 154(b) by 509 days.

(21) Appl. No.: 12/003,051

(22) Filed: Dec. 19, 2007

(65) Prior Publication Data

US 2009/0161551 A1 Jun. 25, 2009

(51) Int. Cl.
*H04L 12/28* (2006.01)
(52) U.S. Cl. ...................................... 370/255
(58) Field of Classification Search .................. None
See application file for complete search history.

(56) References Cited

U.S. PATENT DOCUMENTS

| | | | | |
|---|---|---|---|---|
| 6,801,940 B1 * | 10/2004 | Moran et al. | .................. | 370/230 |
| 6,873,601 B1 * | 3/2005 | Chow et al. | .................... | 370/254 |
| 7,069,180 B1 * | 6/2006 | Holley et al. | ................. | 702/182 |
| 7,321,844 B1 * | 1/2008 | Holley et al. | ................. | 702/182 |
| 2002/0064149 A1 * | 5/2002 | Elliott et al. | .................... | 370/352 |
| 2004/0062204 A1 | 4/2004 | Bearden et al. | | |
| 2004/0151129 A1 * | 8/2004 | Kun-Szabo et al. | .......... | 370/254 |
| 2004/0218548 A1 * | 11/2004 | Kennedy et al. | .............. | 370/254 |
| 2004/0264501 A1 * | 12/2004 | Zalitzky et al. | ............... | 370/252 |
| 2005/0254438 A1 * | 11/2005 | Turk et al. | ...................... | 370/254 |
| 2005/0261933 A1 * | 11/2005 | Magnuson | ........................ | 705/1 |
| 2006/0092931 A1 * | 5/2006 | Walter et al. | .................. | 370/401 |
| 2006/0098625 A1 * | 5/2006 | King et al. | ..................... | 370/352 |
| 2006/0104220 A1 * | 5/2006 | Yamazaki et al. | ............. | 370/254 |
| 2006/0111087 A1 * | 5/2006 | Leitgeb et al. | ............. | 455/414.1 |
| 2006/0218302 A1 * | 9/2006 | Chia et al. | ...................... | 370/352 |
| 2007/0019618 A1 * | 1/2007 | Shaffer et al. | ................. | 370/352 |
| 2008/0037432 A1 * | 2/2008 | Cohen et al. | ................... | 370/241 |
| 2008/0056160 A1 * | 3/2008 | Kamada et al. | ............... | 370/254 |
| 2008/0175228 A1 * | 7/2008 | Chang et al. | .................. | 370/352 |
| 2008/0219177 A1 * | 9/2008 | Flynn et al. | ................... | 370/252 |
| 2008/0225713 A1 * | 9/2008 | Tychon et al. | ................. | 370/231 |
| 2008/0253283 A1 * | 10/2008 | Douglis et al. | ................ | 370/228 |
| 2008/0298229 A1 * | 12/2008 | Ballantyne et al. | ........... | 370/218 |
| 2009/0119776 A1 * | 5/2009 | Palnitkar et al. | ................ | 726/25 |
| 2009/0147692 A1 * | 6/2009 | Hasan et al. | ................... | 370/252 |

OTHER PUBLICATIONS

International Search Report for PCT/US2008/013693 filed Dec. 12, 2008.
Examination Report for Singapore Patent Application No. 201004361-0, dated Jun. 7, 2011.

* cited by examiner

*Primary Examiner* — Chirag Shah
*Assistant Examiner* — Joshua Smith
(74) *Attorney, Agent, or Firm* — Squire Sanders (US) LLP

(57) ABSTRACT

Once the user has configured which call paths to monitor, VOIP automatically creates all the required IP SLA operations, including turning on the responder on the destination side. When these operations disappear, either due to their periodic expiration or due to a router reset, so the service dynamically recreates the IP SLA operations as necessary.

20 Claims, 8 Drawing Sheets

VOIP Node Monitoring Configuration Data 131

Spoke-and-Hub VOIP
Monitoring Configuration
200

Mesh VOIP
Monitoring
Configuration
300

Hybrid VOIP
Monitoring
Configuration
400

INTERNET PROTOCOL SERVICE LEVEL AGREEMENT ROUTER AUTO-CONFIGURATION

BACKGROUND OF THE INVENTION

1. Field of the Invention

Once the user has configured which call paths to monitor, VOIP automatically creates all the required IP SLA operations, including turning on the responder on the destination side. When these operations disappear, either due to their periodic expiration or due to a router reset, so the service recreates them as necessary.

2. Description of the Related Art

In voice over internet protocol (VOIP), telephone communications are sampled, digitized, and transmitted over a data packet transmission network over nodes in a distributed network to provide telephone communications between the nodes. VOIP is becoming increasingly popular due to improvements in performance and excess data transmission bandwidth that allows VOIP communications at relatively low costs. A complete description of VOIP communications are beyond the scope of the present application, but more information regarding VOIP communications can be founding in either ITU H.323, version 6 or IETF Session Initiation Protocol, the subject matters of which are hereby incorporated by reference in full.

In order to provide acceptable VOIP communications, the connections between the various nodes in the distributed networks must be configured. For example, the VOIP communications require sufficiently high QoS to allow data transmission without significant delay or data loss to avoid audio delay or audio loss. Typically, the communications between the VOIP network nodes are defined by service level agreements that define the default communication protocols between the nodes as needed, for example, to maintain the desired QoS levels. The need for high QoS communications needs to be balanced against the network overhead of providing the high QoS communications. Therefore, the service agreements ideally define a high QoS between nodes connection used primarily for VOIP data transfers but a low QoS between nodes connection used primarily for other, non VOIP data transfers.

Thus, these connections between the various nodes are each manually configured. Even a small VOIP network may include several local area networks (LANs), each having numerous interconnected nodes. Consequently, configuring the numerous nodes can be a laborious process.

The ability to pinpoint faults is important in VOIP, and daily support and troubleshooting are typically two of the most difficult parts about running a VOIP system. For example, it is difficult to anticipate the impact of losing that particular router or switch, with the VOIP traffic being rerouted in response to this change. Conventional VOIP monitoring tools monitor a network to pinpoint where problems come from and can model what will happen if the network topology changes. Most of the tools monitor jitter, packet loss, throughput, volume issues, delay, and other quality of service issues from within the network and/or call center applications. Nevertheless, the monitoring of the VOIP transactions over a network remains a tedious process that entails significant costs and computational overhead.

Conventional solutions measure VOIP quality in a "reactive" fashion by tracking end user phone calls from a span port on a switch. However, a local switch port is a poor location to gather network-wide VOIP quality metrics because VOIP quality and performance are determined through the performance of the connection from end-to-end, and monitoring the performance at the end node does not provide adequate information on the performance of the network. Also, monitoring actual call data raises privacy concerns due to the monitoring of actual calls.

Internet Protocol Service Level Agreements (IP SLAs™) enabled by Cisco IOS® software enable VOIP system monitoring by creating and monitoring synthetic voice data traffic. Likewise, other competing products provide similar functionalities. In particular, the various VOIP network components, such as routers and nodes may create synthetic traffic and the transmission of this synthetic traffic may be followed to gauge system performance.

In the CISCO IOS® software that resides on various network routers and nodes, IP SLA is an included feature that allows administrators to analyze IP service levels for IP applications and services, including VOIP. For more information on IP SLA, please refer to the IP SLA user manual at http://www.cisco.com/application/pdf/en/us/guest/products/ps6350/c2001/ccmigration_09186a0080789b77.pdf. IP SLAs use active traffic-monitoring technology to monitor continuous traffic on the network to measure overhead network performance. Routers further provide IP SLA responders that give accuracy of measured data across a network by receiving the synthetic data and forming performance network statistics.

In particular, IP SLAs are often used to generate data which is needed by the Service Level Agreements to define the characteristics of a connection between two network components, such as two nodes. With IP SLAs or similar synthetic voice data distribution tools, routers and/or switches may perform periodic measurements to monitor the status of the VOIP network and to collect network performance statistics without intruding on actual voice calls. These statistics include MOS, jitter, network latency, packet loss and other important QoS metrics that provide detailed visibility into VOIP performance.

The use of synthetic traffic throughout the system avoids the above-described privacy concerns while still providing reasonably accurate system performance measurements. Nevertheless, the use of synthetic traffic also has shortcomings. The data produced by the measurements of the systematic traffic may be voluminous and difficult to process. Also, the creation and transmission causes significant system overhead due bandwidth during the transmission of the synthetic traffic. Also, the processing of the synthetic traffic to produce the performance measurements burdens the processors in the routers and other associated network components.

Furthermore, programming of the VOIP nodes for IP SLA monitoring can be tedious. As described above, even a small VOIP may have numerous nodes. Also, a user is faced with the decision of using long term or permanent IP SLA that may consume excess network resources and produce large volumes of data, or using short term IP SLA that may expire during a desired monitoring period.

SUMMARY OF THE INVENTION

In response to these and other needs, embodiments of the present invention provide a methodology and related tool for guiding a user in configuring monitoring of VOIP operation in the network nodes. Once the user has configured which call paths to monitor, VOIP automatically creates all the required IP SLA operations, including turning on the responder on the destination side. When these operations disappear, either due to their periodic expiration or due to a router reset, so the service dynamically recreates the IP SLA operations as necessary.

A system for an automatic configuration of nodes to monitor a Voice over IP (VOIP) network is provided. The system includes a first storage device configured to receive a user selection of nodes to monitor the VOIP network and a duration for the monitoring by the nodes; a second storage device configured to store commands for configuring the nodes to perform the monitoring; and a server configured to determine a monitoring status of each of the nodes and to compare the status with the user selection, and when the monitoring status does not conform with the user selection, the server further configured to access the second storage device to obtain an appropriate command to update a configuration of the nodes for the monitor of the VOIP network.

The system further may include third storage configured to store a configuration status of the nodes. The monitoring may include a transmission and monitoring of synthetic data in the VOIP network. Also, the monitoring may include establishing an IP SLA between two or more of the nodes. The second storage device may include commands to form the IP SLA. The server may be further configured to determine when one of the IP SLA expires. Similarly, the server may also be configured to determine when one of the nodes is reset.

The system may include a user interface configured to provide the user selection. The user interface may display results from the monitoring. In particular, the user interface may display results from the monitoring when the results indicate when the VOIP network is operating outside of a pre-specified parameter.

Alternatively, a disclosed method for an automatic configuration of nodes to monitor a Voice over IP (VOIP) network, the method includes the steps of storing a user selection of nodes to monitor the VOIP network and a duration for the monitoring by the nodes; storing commands for configuring the nodes to perform the monitoring; monitoring the VOIP network; determining a monitoring status of each of the nodes and to compare the status with the user selection, and when the monitoring status does not conform with the user selection; accessing the second storage device to obtain an appropriate command to update a configuration of the nodes for the monitor of the VOIP network; and forwarding the command to the node.

The method may further include storing a configuration status of the nodes. The monitoring includes transmitting and monitoring synthetic data in the nodes of the VOIP network. Else, the monitoring includes establishing an IP SLA between two or more of the nodes. The commands includes commands to form the IP SLA. The method further includes determining when one of the IP SLA expires. Results from the monitoring are displayed when the results indicate that the VOIP network is operating outside of a pre-specified parameter. The method further includes determining when one of the nodes is reset.

A program storage device readable by a machine, embodying a program of instructions executable by the machine, the instructions including storing a user selection of nodes to monitor the VOIP network and a duration for the monitoring by the nodes; storing commands for configuring the nodes to perform the monitoring; monitoring the VOIP network; determining a monitoring status of each of the nodes and to compare the status with the user selection, and when the monitoring status does not conform with the user selection; accessing the second storage device to obtain an appropriate command to update a configuration of the nodes for the monitor of the VOIP network; and forwarding the command to the node.

Again, the monitoring includes transmitting and monitoring synthetic data in the VOIP network, and the monitoring preferably includes establishing an IP SLA between two or more of the nodes. The instructions further include determining when one of the IP SLA expires, or when one of the nodes is reset.

DETAILED DISCLOSURE OF THE PREFERRED EMBODIMENTS

Figure 1A:
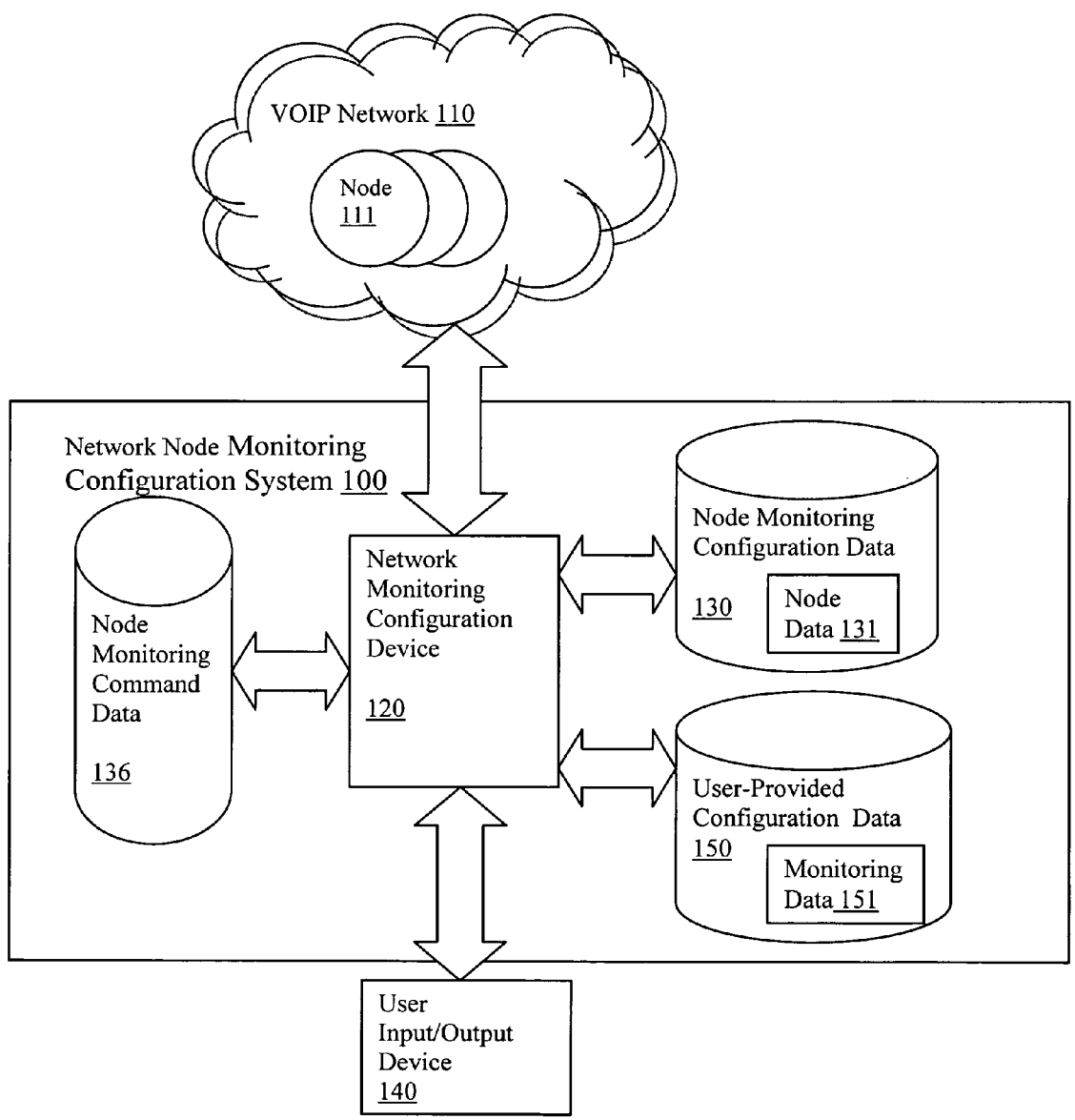
FIG. 1A depicts a block diagram of elements of a VOIP monitoring configuration system in accordance with an embodiment of the present application.
Figure 1B:
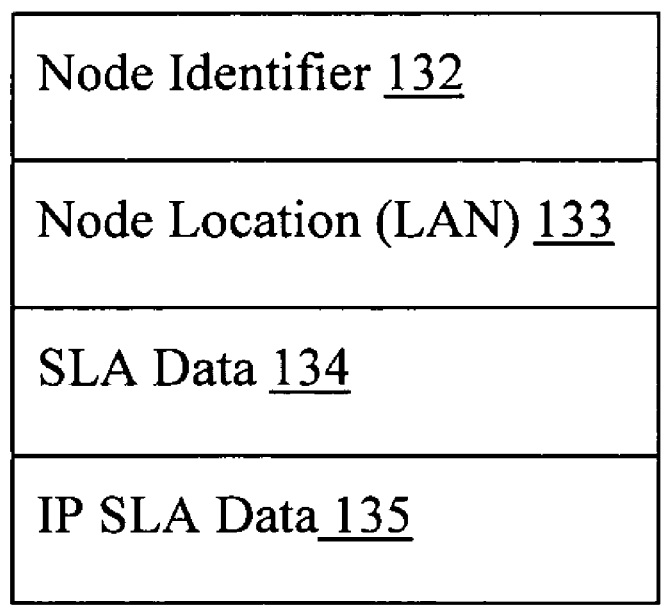
FIG. 1B depicts a node configuration data record in accordance with embodiments of the present application.

Referring now to FIG. 1, a voice over IP (VOIP) monitoring configuration system 100 in accordance with an embodiment of the present invention is provided. In particular, the VOIP monitoring system 100 includes a VOIP network 110 that includes multiple nodes 111. A VOIP monitoring configuration device 120 is connected to the network 110 as needed to exchange data with the nodes 111. The VOIP configuration device 120 generally enables the user to access and control the configurations for the connections between the various nodes 111 in the network 110. The particular function of the VOIP monitoring configuration device 120 will be described in greater detail below.

The VOIP monitoring configuration system 100 may further include a node monitoring configuration database 130 that includes data 131 regarding the status of the various nodes 111 and the status of the connection between the nodes. For example, as described in FIG. 1B, the node monitoring configuration data 131 for a particular node 111 may include a node identifier 132 and information regarding a network or geographic location of that node 133. The node monitoring configuration data 131 may further include data regarding the service levels agreements (SLAs) 134 between that node and other nodes. As well-known in the field of networks, the SLA defines default communication change configuration values between that node and other connected nodes. Thus, the SLA data 134 may include, for example, the nodes involved in the SLA, the connection configurations defined in the SLA, and the duration of the SLA.

Similarly, node monitoring configuration data 131 may further include data regarding the IP service levels agreements (IP SLAs) 135 between that node and other connected nodes. The IP SLAs 135 or other VOIP monitoring configuration data described the transfer of synthetic, or false, data between two or more nodes and directs the nodes to monitor the transfer of this synthetic as needed to calculate performance measures for that transfer. Thus, the IP SLA data 134 may similarly include, for example, the nodes involved in the IP SLA, details regarding the synthetic data to be transferred and the measurements to be calculated, and the duration of the IP SLA.

Although the node configuration data 131 is depicted as residing on the VOIP monitoring configuration database 130, it should be appreciated that the node configuration data 131 may actually reside on the respective nodes 111 in the VOIP network 110, and the VOIP monitoring configuration database 130 may contain copies of this data or otherwise contain information on the location of the VOIP node monitoring configuration data.

Returning back to FIG. 1A, a user interface 140 provides a system administrator or other user access to the VOIP monitoring configuration tool 120. The user interface 140 may be, for example, an application resident on a local computer that administers and controls access to the VOIP monitoring configuration tool 120. Similarly, the user interface 110 may be a program served from the VOIP monitoring configuration tool 120 or an associated data server and executed on a browser application resident on the system administrator's computer. As described in greater detail below, the user interface 140 receives and displays one or more aspects of the VOIP node data 131. The user interface 140 further accepts inputs from the user and allows the user to specify various configuration settings for the VOIP node monitoring. Optionally, the user-specified VOIP node monitoring selections 151 may be stored in a VOIP node monitoring selections data table 150. For example, the user may specify the nodes and connections to be monitored using the synthetic traffic and the duration for this monitoring. The user could likewise specify other aspects of the IP SLA monitoring, such as the type of synthetic data to be transmitted and other selectable aspects of the monitoring such as the specified connection transmission parameters.

Optionally, in one implementation, the VOIP monitoring configuration device 120 further has access to a monitoring command repository 136 that contains monitoring commands to implement the IP SLAs for the nodes 111. For example, the command repository 136 may contain different specific commands as needed to implement the IP SLAs for each of the nodes 111, and these commands may be selected and implemented as needed to achieve the desired IP SLAs. Alternatively, as known in the art of node configuration, the monitoring command repository 136 may include generic IP SLA configuration commands that are finalized and carried out using the specific node and connection data contained in the node database 130. It should be appreciated that node connection tools are well known and may be leveraged as needed.

In preferred operation, the user interface 140 presents general status data from the regarding the status of monitoring of the various nodes 111 in the monitored VOIP network 110. For example, the user interface 140 may list one or more of the nodes 111 and describe the configuration of the monitoring of the connections from that node 111. Alternatively, the nodes 111 and the connections between which may be graphically depicted according to known techniques. After viewing the monitoring status of the nodes 111 and the connections, the user may provide commands to modify the monitoring configuration of the nodes 111. In particular, in the embodiments of the present application, the user may select general VOIP network monitoring configurations that are then implemented through changes in IP SLAs to achieve the desired configurations with minimal manual programming required by the user.

Optionally, the user interface 140 may present this data to the user to display the functional status of the nodes, such as the measured performance statistics. The user interface 140 may further flag nodes that are operating outside of pre-set performance goals, as suggested by the measured performance statistics formed using the synthetic data transmissions.

Figure 2:
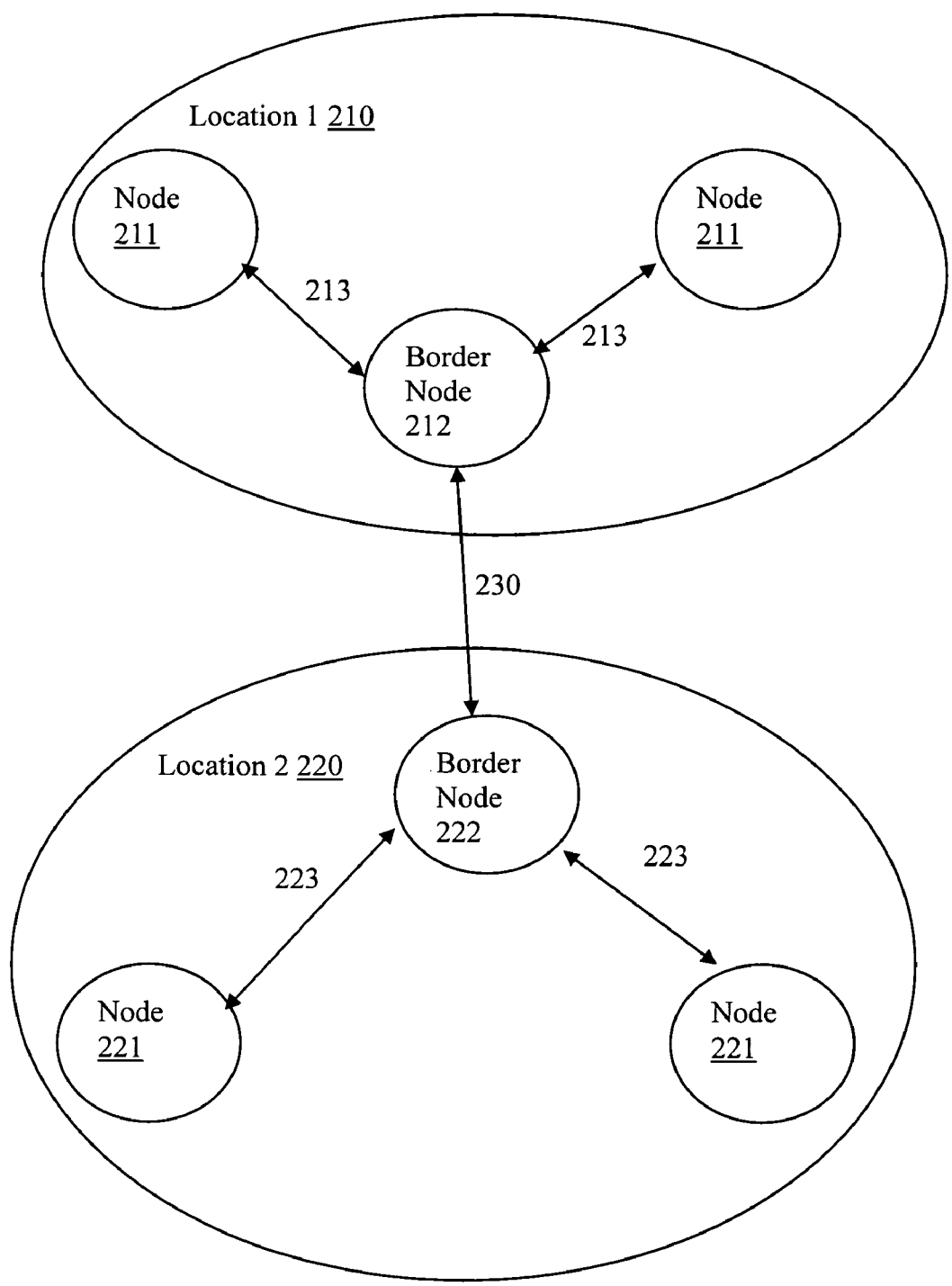
FIG. 2 depicts a VOIP network configured to monitor nodes in a spoke and hub configuration in accordance with an embodiment of the present application.
Figure 3:
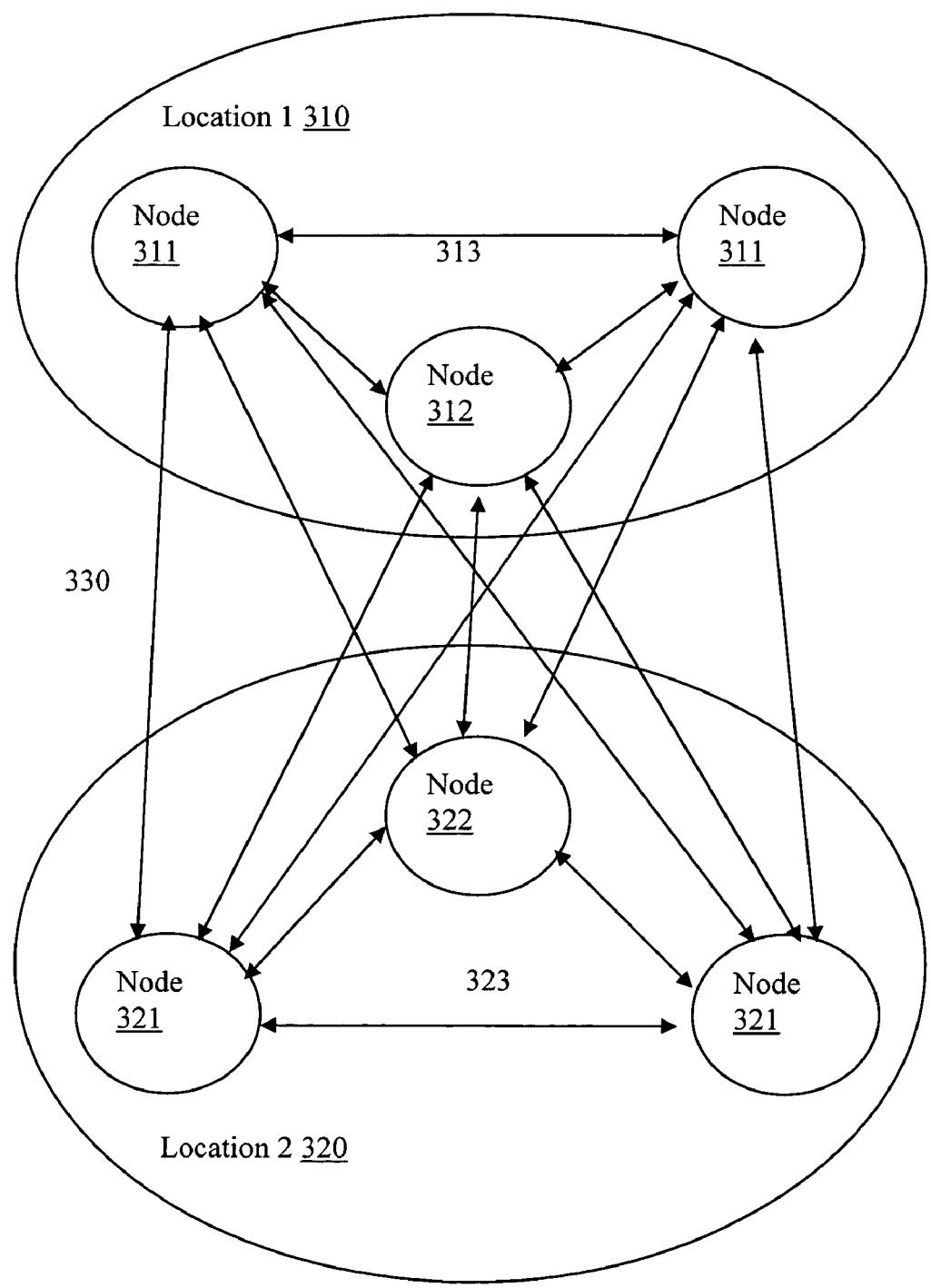
FIG. 3 depicts a VOIP network configured to monitor nodes in a mesh configuration in accordance with an embodiment of the present application.
Figure 4:
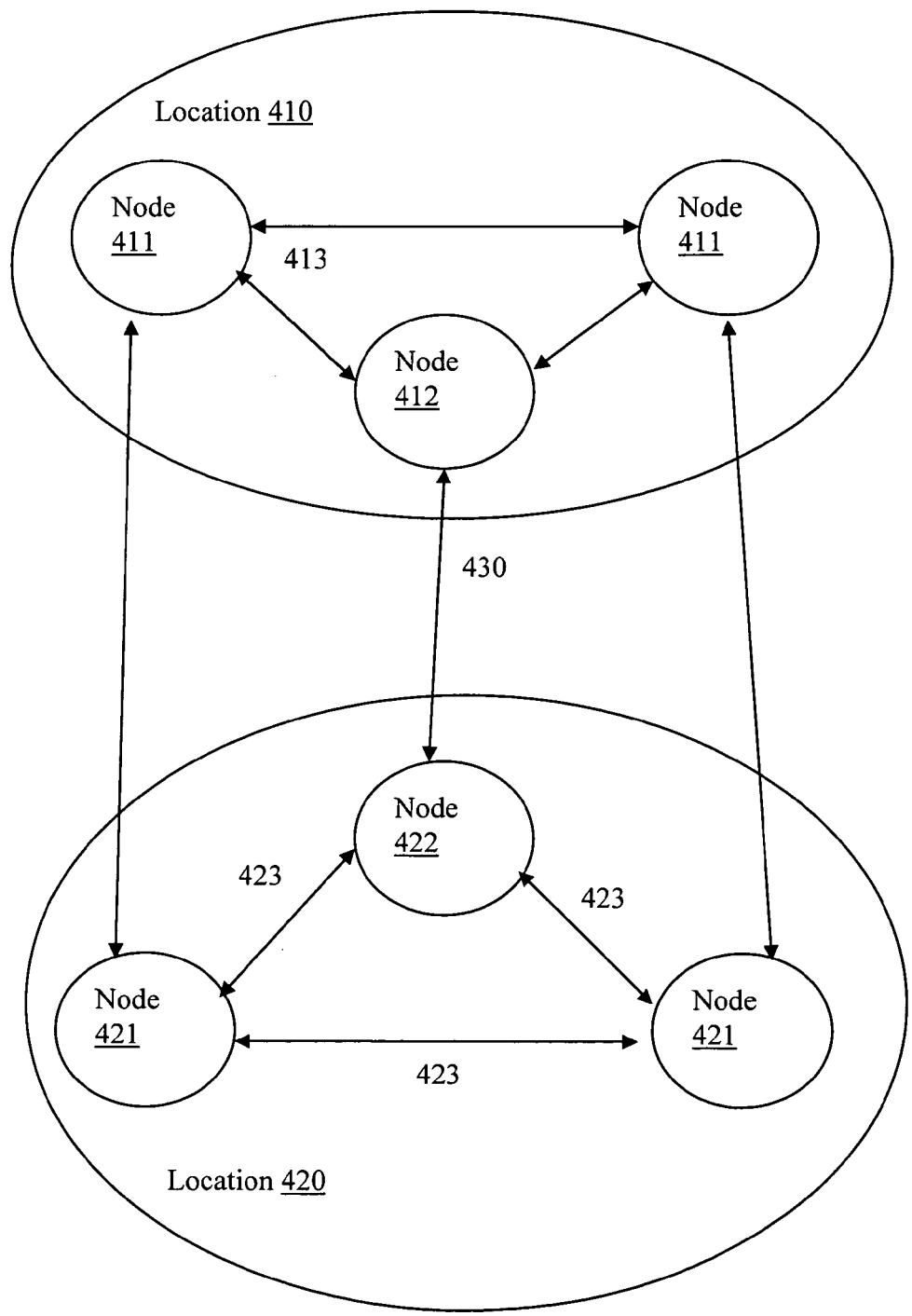
FIG. 4 depicts an exemplary VOIP network configured to monitor nodes in a custom configuration in accordance with an embodiment of the present application.

Referring now to FIGS. 2-4, embodiments of the present application allows the user to select between three default monitoring settings, mesh, spoke-and-hub, and custom. It should be appreciated that other default configurations are possible and that the following description of the mesh, spoke-and-hub, and custom configurations is provided for purposes of illustration and not limitation.

Referring now to the spoke and hub VOIP monitoring configuration 300 in FIG. 3, the depicted VOIP network includes two locations, location 1 210, and location 2 220. As understood in networking, these locations may refer to either geographic or network locations, and typically each of the locations 210, 220 includes multiple nodes, respectively, 211, 212 and 221, 222 that combine to form LANs. In particular, the spoke and hub VOIP monitoring configuration includes defined internal nodes 211 that communicate along internal connections 213 to a border node 212 at the first location 210. Similarly, the second location 220 is defined to monitor internal nodes 221 connected through internal connections 223 to a border node 222. The border nodes 212, 222 are configured to communicate synthetic data over a channel 230.

Thus, the hub-and-spoke configuration includes a subset of the sites/nodes 212, 222 that are designated by the user as "hubs" and all others nodes 211, 221 as "spokes." In particular, an exchange of synthetic data is monitored between the hub nodes 212, 222 and every other nodes 211 or 222 at the location, whereas the spoke nodes 211, 221 exchange of synthetic data only with one or more of the hub nodes 212 or 222 at the appropriate location. Also, the hub nodes 212, 222 are connected to exchange of synthetic data. For example, a spoke-and-hub configuration may be used advantageously in an organization with offices in multiple locations. The telephones in each of the separate locations (i.e., a LAN 210, 220) may be monitored as meshed, whereas the intra-location traffic many be monitored along connection 230 between the hubs 212, 222.

Referring again to FIG. 1, the user interface 140 forwards the user's designation of the hub and spokes to the VOIP monitoring configuration tool 120. The user may specifically elect the hubs nodes 212, 222 and/or the spoke hubs 211, 221. Alternatively, the user may present logical criteria (e.g., performance and/or compatibility requirements) and the VOIP monitoring configuration tool 120 may designate the hubs nodes 212, 222 and/or the spoke hubs 211, 221 based on these selection criteria.

Using this data, the VOIP monitoring configuration tool 120 may present to the user, via the user interface, the status of the connections 213, 223, 230 relevant to the spoke-and-hub configuration 200. For example, the displayed status information may include statistical information describing the performance of the connections from each of the designated hubs 212, 222. In this way, the connections between the spoke hubs 211, 221 are omitted to simplify the user's review of the connections status of the connections.

When implementing the hub-and-spoke network monitoring configuration 200, the VOIP monitoring configuration tool 120 may optionally propagate commands to the hub nodes 212, 222 to initiate IP SLA transactions in the connections 213, 223, 230 with the other hub nodes 212, 222 and the spoke nodes 211, 221, but the commands to the spoke nodes 211, 221 to initiate the IP SLA transaction connections only with one or more of the specified hub nodes 212, 222. For example, the VOIP monitoring configuration tool 120 could access the node database 130 to determine the IP SLA status of each of the hub nodes 212, 222 and the spoke nodes 211, 221. The VOIP monitoring configuration tool 120 could then access the configuration command database 136 to obtain desired command codes as needed to activate the IP SLAs for each of the connections 213, 223, 230. Alternatively, the VOIP monitoring configuration tool 120 could determine from the database 130 which of the nodes 211, 212, 221, 222 need to be reconfigured and which already have the desired IP SLAs for monitoring the VOIP network. Then, only the nodes 211, 212, 221, 222 associated with connections 213, 223, 230 to be monitored would receive new commands for the IP SLAs.

Referring now to FIG. 3, the mesh VOIP monitoring configuration 300 monitors the connection of every node to every other node. As described above, the fully meshed monitoring network typically requires the network overhead by committing the most network bandwidth to the synthetic VOIP data transfers and to the processing of the IP SLA performance statistics. In a typical situation, the mesh VOIP network monitoring may be desired where there are numerous calls between each of the nodes.

The depicted mesh VOIP network monitoring configuration 300 includes two locations, location 1 310, and location 2 320. Each of the locations 310, 320 includes multiple nodes, respectively 311, 312 and 321, 322 that combine to form the LANs 310 and 320. In particular, the mesh VOIP monitoring configuration 300 includes defined internal nodes 311, 321 and border node 312, 322 at the location 310, 320. However, the internal nodes 311, 321 and border node 312, 322 in the mesh configuration 300 are now configured to communicate synthetic data for IP SLA measurements over both intra-location channels 313, 323 and inter-location channels 330.

Referring back to FIG. 1, when implementing the full mesh, the user may view the IP SLA status of each of the nodes 111. In that way, the user may determine whether the nodes 111 need to be updated to achieve the desired mesh monitoring configuration. Typically, the displayed IP SLA status would include all of the nodes 111, as needed to determine the status of the mesh.

Optionally, the VOIP monitoring configuration tool 120 would typically propagate IP SLAs to each of the nodes 111 to initiate monitoring agreements. For example, the VOIP monitoring configuration tool 120 could access the node database 130 to determine the monitoring status each of the nodes 111. The VOIP monitoring configuration tool 120 could then access the configuration command database 136 to obtain desired IP SLAs commands for each of the nodes 111 and, then, forward these commands to the appropriate nodes to initiate the IP SLAs. Alternatively, the VOIP monitoring configuration tool 120 could determine from the database 130 which of the nodes 111 need to be reconfigured for IP SLA measurements and which are already monitoring the appropriate communications between other nodes.

In another VOIP connection configuration, the user may designate a custom desired network configuration that is neither a mesh nor a hub and spoke by selecting which of the individual nodes 111 to monitor. For example, FIG. 4 depicts an exemplary custom network monitoring configuration 400 in which the nodes 411, 412 and 421, 422 in two locations, location 1 410, and location 2 420 are programmed to monitor synthetic communications with selected other nodes. In particular, the custom VOIP monitoring configuration 400 again includes defined nodes 411, 421 and 412, 422 at the location 410, 420. However, the internal nodes 411, 421 and border node 412, 422 in the custom configuration 400 are now configured to communicate synthetic data for IP SLA measurements according to user-defined conditions. For example, the depicted custom monitoring occurs in selected intra communication channels 413, 423 and selected inter-location channels 440. In this way, monitoring occurs in more nodes than in the spoke and hub configuration of FIG. 2 but less nodes than in the mesh configuration of FIG. 3

Referring again to FIG. 1, the user interface 140 forwards the user's designation of the relevant nodes 111 for monitoring to the VOIP monitoring configuration tool 120. Alternatively, the user may again present logical criteria (e.g., performance and/or compatibility requirements) and the VOIP monitoring configuration tool 120 may designate relevant nodes 111 based on these selection criteria. Using this data, the VOIP monitoring configuration tool 120 may present to the user, via the user interface 140, the monitoring status of the nodes 111 relevant to the desired custom configuration 400. For example, the displayed status information may include information describing the monitoring of connections from certain designated hubs 111 while omitting the monitoring status of other connections.

When implementing a custom configuration, similar to the implementation of the mesh configuration 300 and the hub-and-spoke configuration 200, the VOIP monitoring configuration tool 120 would propagate commands to the nodes 111 to initiate IP SLAs in the desired connections according to the user's specifications. The VOIP monitoring configuration tool 120 could then access the configuration command database 136 to obtain desired IP SLAs commands for each of the nodes 111 as needed to configure the desired IP SLAs. Alternatively, the VOIP monitoring configuration tool 120 could determine from the node database 130 which of the nodes need to be reconfigured to perform the desired monitoring and which of the nodes 111 are already set at desired a monitoring configuration. Then, only the nodes 111 needing IP SLA configuration changes would receive new commands.

Figure 5:
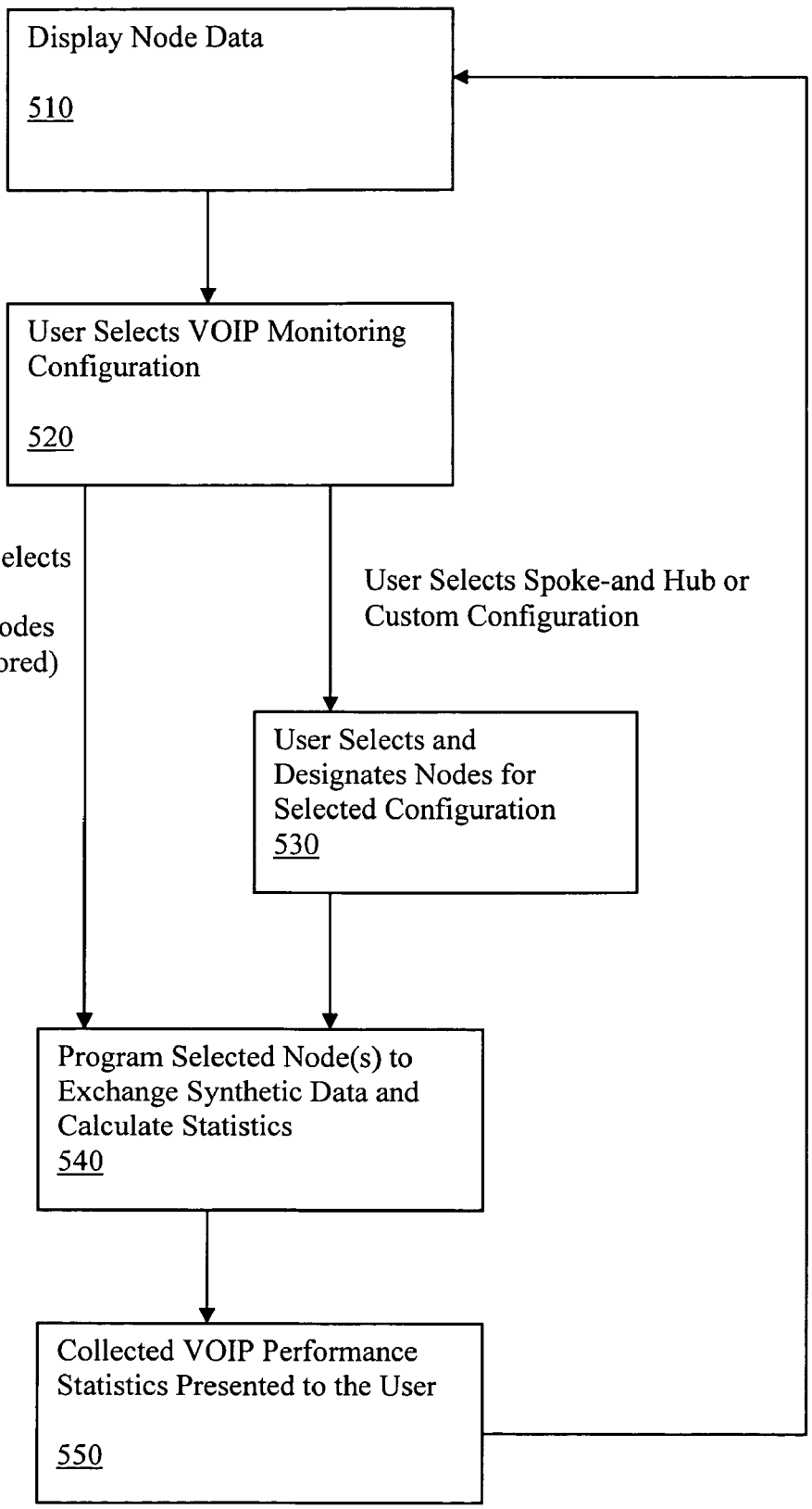
FIG. 5 illustrates a flow chart of a VOIP monitoring method according to an embodiment of the present application.

Referring now to FIG. 5, a VOIP monitoring configuration method 500 is presented. The method 500 includes a display of the node monitoring data 510 and a user selection of a desired node monitoring configuration 520. For example, as described above, the user may specify a mesh monitoring configuration 300, and hub and spoke monitoring configuration 200, or a custom monitoring configuration 400. If the user selects a mesh configuration, then communications channels between all of the nodes are selected to be monitored. Otherwise, the user in step 530 designates the nodes and channels to be monitored. As described above, the user can define border and internal nodes.

Continuing with method 500, the selected nodes are configured to be monitored in step 540, such as configuring IP SLAs to transmit synthetic traffic and to measure the transmissions. The collected VOIP performance data may then be collected and displayed to the user in step 550, as described above.

For example, when using either H.323 or SIP, the IP SLAs VOIP call setup operation can measure the total time from when an originating gateway sends a call message (containing a call number) to when the originating gateway receives a message from the terminating gateway (destination) indicating that either the called number rang or the called party answered the call. The user can configure the VOIP call setup operation to repeat at specified time intervals, for a specified number of repetitions, and over a specified duration of time. If a gatekeeper (GK) or directory gatekeeper (DGK) is involved in the H.323 call signaling, additional messages are sent and received between the originating and terminating gateways before the call message (containing a call number) is actually sent. The additional time required for these messages is included in the IP SLAs VOIP call setup response time measurement. Likewise, if a proxy server or redirection server is involved in the SIP call signaling, any additional time required for messages to be sent and received (prior to sending the call message) is included in the VOIP call setup response time measurement. These tasks are performed on the originating gateway (source) in order to start the IP SLAs VOIP test-call application to set up the dial peer to route the test call, to define the VOIP call setup operation, and to schedule the VOIP call setup operation.

Figure 6:
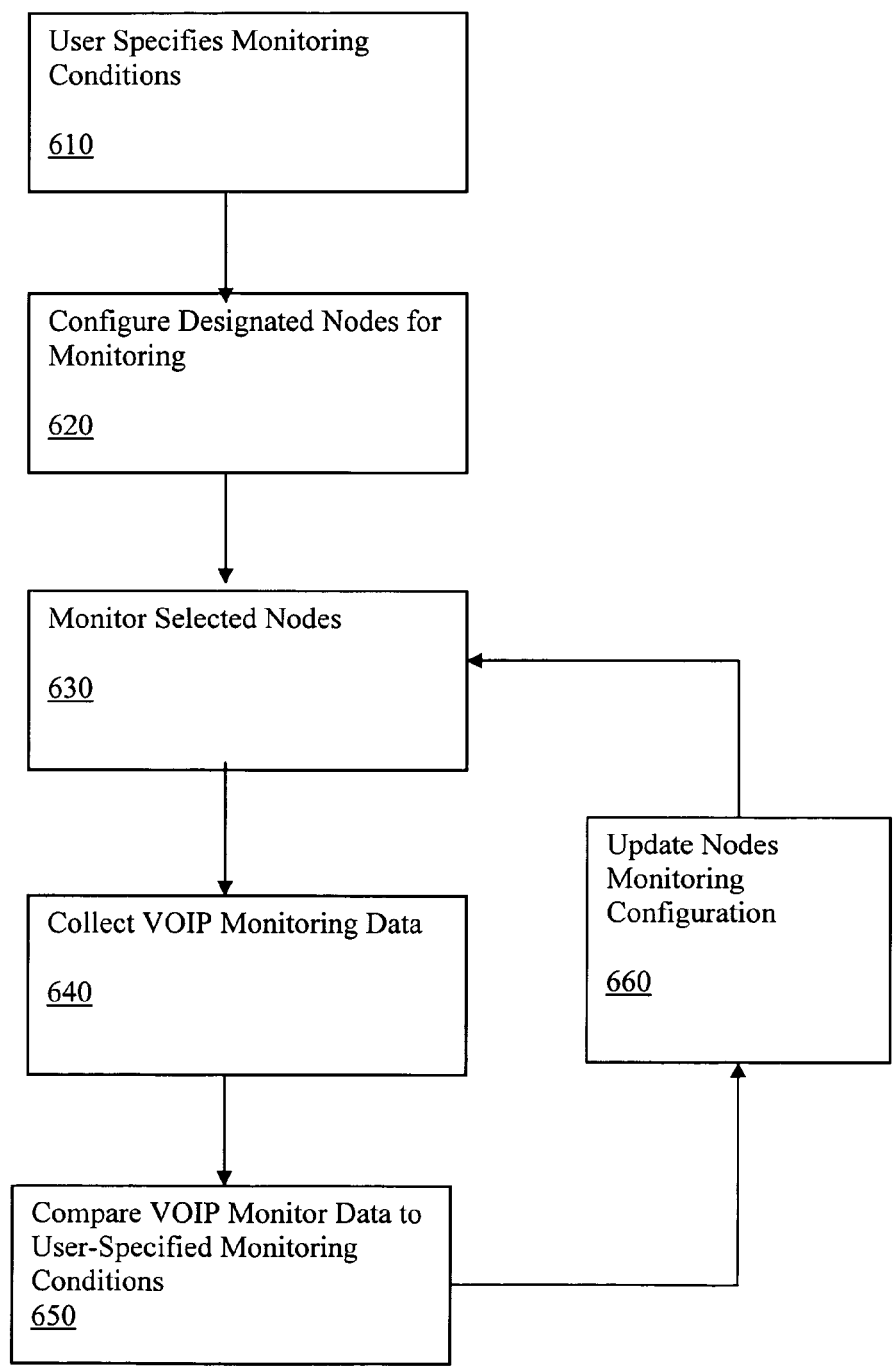
FIG. 6 illustrates a VOIP dynamic node monitoring configuration method according to another embodiment of the present application.

Referring now to FIG. 6, another embodiment of the present invention relates to a method 600 for dynamically monitoring and configuring the nodes for monitoring after receiving user preferences. As described above, initial user monitoring preferences may be received in step 610 and the nodes may be initially configured in step 620 according to the user specified monitoring selections. After the nodes are appropriately configured, for example, by specifying the desired IP SLAs, the nodes are monitored in using the transmission of synthetic data in step 630, and the VOIP system data is collected in step 640.

Continuing with method 600, the collected VOIP monitoring data from step 640 is compared to the initial user specified monitoring conditions in step 650. For example, the performance of the specified nodes can be evaluated in insure that the desired monitoring is occurring. If no performance statistics are returned or if the performance statistics are otherwise do not correctly reflect the user's monitoring instructions from step 610, those monitoring problem nodes can be identified. For example, if an IP SLA for a node expires, that node will not return desired monitoring results. The node configurations can be updated to reflect the desired monitoring changes in step 660 to address any problems in the monitoring.

Referring now back to FIG. 1, the implementation of the method 600 is not quickly summarized. In particular, the user interface 140 can accept and forward user monitoring preferences to a VOIP monitoring configuration tool 120. The VOIP monitoring configuration tool 120 stores the user-specified VOIP node monitoring selections 151 in the VOIP node monitoring selections data table 150, and these selections may be used to configure the IP SLAs or other node monitoring techniques, and these changes are stored in the node monitoring configuration data table 130.

After monitoring occurs and results, i.e., IP SLA statistics, are returned from the monitored nodes, theses results can be compared with the user provided configuration data 150 by the VOIP monitoring configuration tool 120 to identify any nodes that are not being properly monitored, as directed in the stored user monitoring preferences. Alternatively, the VOIP monitoring configuration tool 120 can periodically or dynamically update the node monitoring configuration data table 130 with IP SLA status data collected from the nodes 111, and the node monitoring configuration data 131 can be compared to the VOIP node monitoring selections 151 in the VOIP node monitoring selections data table 150 to identify nodes that are not conforming to the user's VOIP monitoring selections 151.

After these nodes are identified, the VOIP monitoring configuration tool 120 can update the node monitoring configuration data 131 as needed to accomplish the user's VOIP monitoring selections 151. For example, as described above, the VOIP monitoring configuration tool 120 can access a node monitoring command database 136 to acquire and form appropriate commands as needed to form the desired IP SLAs for the desired nodes.

Figure 7:
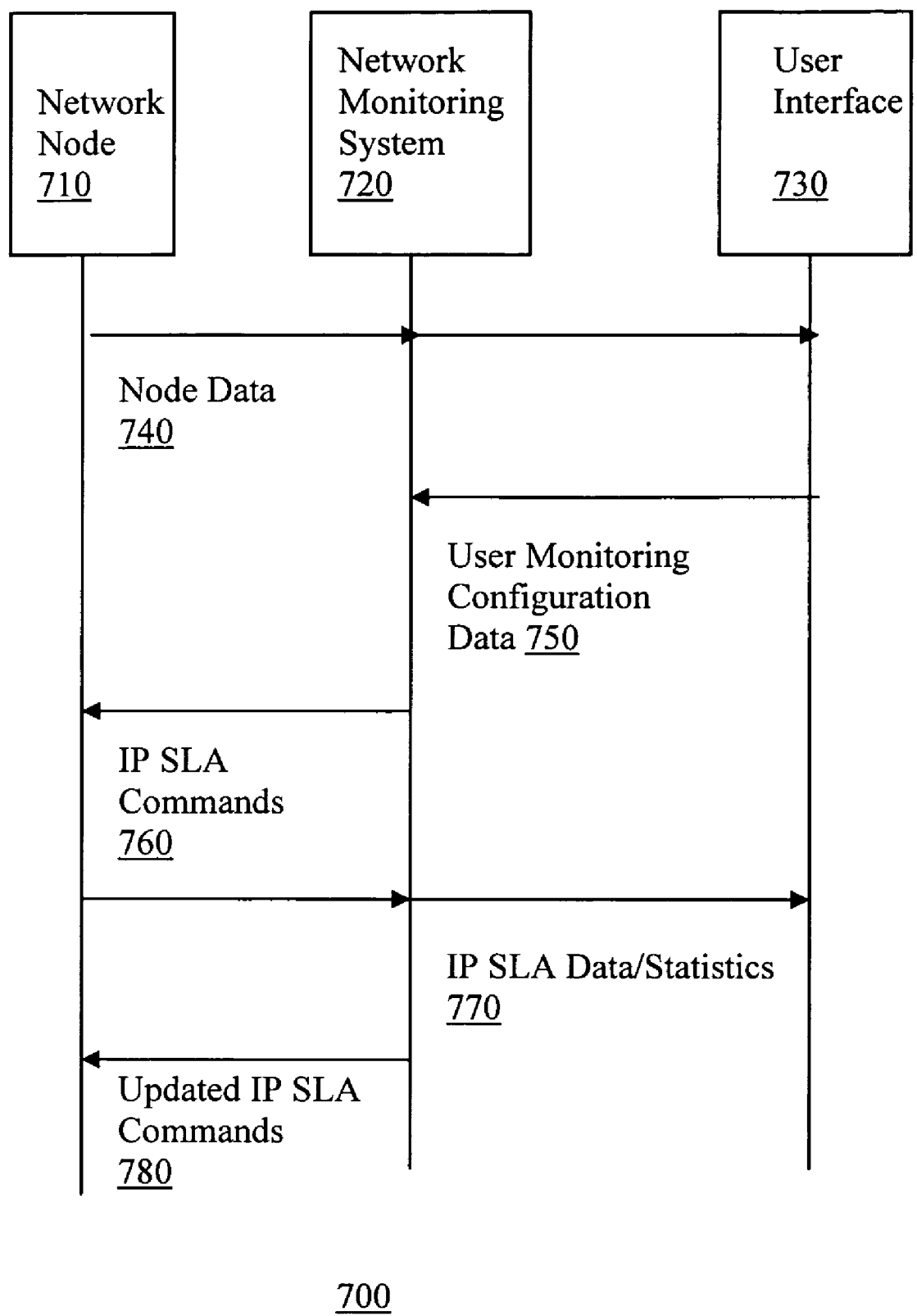
FIG. 7 depicts a process flow of the VOIP dynamic node monitoring configuration method of FIG. 6 according to an embodiment of the present application.

Referring now to FIG. 7, a process flow 700 for automatic IP SLA operation recreation is provided. In particular, the process flow 700 includes the interaction of three components, namely a network node 710, a networking monitoring configuration system 720, and a user interface 730. Initially, node data 740 describing the nodes and the configuration of the node monitoring is collected from the node 710 by the networking monitoring configuration system 720 and forwarded to a user interface 730. In response this node configuration data 740 that describes the node 710 and its monitoring status, the user interface 730 forwards user monitoring configuration data 750 to the networking monitoring configuration system 720. the networking monitoring configuration system 720 uses the received user monitoring configuration data 750 and the node configuration data 740 to form appropriate IP SLA commands 760, as needed to affect the desired monitoring of the user configured call paths.

Continuing with the process flow 700 in FIG. 7, the networking monitoring configuration system 720 receives the IP SLA data and/or statistics 770 and forwards these data/monitoring statistics to the user interface 730. The networking monitoring configuration system 720 also reviews the received user monitoring configuration data 750 to determine if the monitoring is conforming to the received user monitoring configuration data 750. For example, if one of the IP SLAs has expired within a time period for desired monitoring, the returned configuration data may reflect this expiration. Alternatively, the monitoring data will be incomplete for the desired IP SLA. In response, the networking monitoring configuration system 720 forwards updated IP SLA commands 780 to re-initiate the expired IP SLA as needed to complete the desired VOIP node monitoring as specified in the received user monitoring configuration data 750.

As discussed above, various embodiments of the invention can be configured in numerous physical elements, or can be configured at a single network element or configured in a number of elements having various disclosed functions distributed throughout. The control of the IP SLA or other monitoring configurations and other functions can be performed at various network components, such as at a user equipment, at VOIP server, at an access gateway or at another network component associated with the VOIP network and access to the network.

A person of ordinary skill in the art would understand that the above-discussed embodiments of the invention are for illustrative purposes only, and that the invention can be embodied in numerous configurations as discussed above. Additionally, the invention can be implemented as a computer program on a computer readable medium, where the computer program controls a computer or a processor to perform the various functions which are discussed as method steps and also discussed as hardware or hardware/software elements.

What is claimed:

1. A system for an automatic configuration of nodes to monitor a Voice over internet protocol (VOIP) network, the system comprising:

a first storage device configured to receive a user selection of monitoring conditions comprising nodes to monitor said VOIP network and a duration for said monitoring by said nodes;

a second storage device configured to store commands for configuring said nodes to perform said monitoring; and a server configured to determine a monitoring status of each of said nodes and to compare said status with said user selection, and when said monitoring status does not conform with said user selection, said server further configured to access said second storage device to obtain an appropriate command to update a configuration of the nodes for said monitoring of said VOIP network, wherein the monitoring comprises establishing an IP service level agreement (SLA) between two or more of said nodes indicated by the user selection, and wherein said second storage device comprises commands to form said IP SLA.

2. The system of claim 1, further comprising third storage configured to store a configuration status of said nodes.

3. The system of claim 1, wherein the monitoring comprises a transmission and monitoring of synthetic data in the VOIP network.

4. The system of claim 1, wherein the server is further configured to determine when one of said IP SLA expires.

5. The system of claim 1 further comprising a user interface configured to provide said user selection.

6. The system of claim 5, wherein the user interface is further configured to display results from said monitoring.

7. The system of claim 5, wherein the user interface is further configured to display results from said monitoring when said results indicate when said VOIP network is operating outside of a pre-specified parameter.

8. The system of claim 1, wherein the server is further configured to determine when one of said nodes is reset.

9. A method for an automatic configuration of nodes to monitor a Voice over internet protocol (VOIP) network, the method comprising:

storing a user selection of monitoring conditions comprising nodes to monitor said VOIP network and a duration for said monitoring by said nodes;

storing commands for configuring said nodes to perform said monitoring;

monitoring said VOIP network;

determining a monitoring status of each of said nodes and comparing said status with said user selection, and when said monitoring status does not conform with said user selection, accessing said second storage device to obtain an appropriate command to update a configuration of the nodes for said monitor of said VOIP network; and forwarding said command to said node, wherein the monitoring comprises establishing an IP service level agreement (SLA) between two or more of said nodes indicated by the user selection, and whereon said commands comprise commands to form said IP SLA.

10. The method of claim 9, further comprising storing a configuration status of said nodes.

11. The method of claim 9, wherein the monitoring comprises transmitting and monitoring synthetic data in said nodes of the VOIP network.

12. The method of claim 9 further comprising determining when one of said IP SLA expires.

13. The method of claim 9 further comprising providing a user interface to accept said user selection.

14. The method of claim 9 further comprising displaying results from said monitoring.

15. The method of claim 9, wherein the results from said monitoring are displayed when said results indicate that said VOIP network is operating outside of a pre-specified parameter.

16. The method of claim 9 further comprising determining when one of said nodes is reset.

17. A program storage device readable by a machine, embodying a program of instructions executable by the machine, said instructions comprising:

storing a user selection of monitoring conditions comprising nodes to monitor a voice over internet protocol (VOIP) network and a duration for said monitoring by said nodes;

storing commands for configuring said nodes to perform said monitoring;

monitoring said VOIP network;

determining a monitoring status of each of said nodes and to compare said status with said user selection, and when said monitoring status does not conform with said user selection, accessing said second storage device to obtain an appropriate command to update a configuration of the nodes for said monitor of said VOIP network; and forwarding said command to said node, wherein the monitoring comprises establishing an IP service level agreement (SLA) between two or more of said nodes indicated by the user selection, and whereon said commands comprise commands to form said IP SLA.

18. The program storage device of claim 17, wherein the monitoring comprises transmitting and monitoring synthetic data in the VOIP network.

19. The program storage device of claim 17, wherein the instructions further comprise determining when one of said IP SLA expires.

20. The program storage device of claim 17, wherein the instructions further comprise when one of said nodes is reset.

* * * * *